United States Patent Office 2,820,731
Patented Jan. 21, 1958

2,820,731

PHOSPHATE COATING COMPOSITION AND METHOD OF COATING METAL THEREWITH

Edward Heinzelman, Jr., Palisades Park, and Stanley C. Williamson, Belford, N. J., assignors to Oakite Products, Inc., New York, N. Y., a corporation of New York No Drawing. Application March 21, 1955
Serial No. 495,819

10 Claims. (Cl. 148—6.15)

The invention relates to the production of phosphate coating on metals, and particularly to the production of such coatings containing phosphates of zinc or manganese. More especially, it relates to compositions of matter adapted to be used in producing such coatings, and to the process of applying such compositions. It contemplates in its more specific aspects the use of compositions containing, in addition to the phosphoric acid radical and zinc or manganese, the nitric acid radical.

This application is a continuation-in-part of our application Serial No. 289,001, filed May 20, 1952, now abandoned.

We have found that improved phosphate coatings may be produced on ferrous metals, aluminum, zinc and other metals by treating them with an aqueous solution of phosphating compositions containing substantial quantities of oxidizing agents as well as zinc or manganese to which have been added a small proportion of a zirconium compound in which the zirconium is present in basic form as an accelerator for the deposition and conditioning of the coating. Phosphate coatings produced in the manner described herein will consist of fine, even, well integrated crystals in a thickness of as much as 1000 mg. per square foot. The coatings impart corrosion protection to the base metal and also form a surface with which paint will form a strong bond if the surface is to be painted. Such layers also act as lubricants or as aids in working metal coated therewith.

Zirconium appears to be effective only when used in the presence of substantial proportions of zinc or manganese, and only when oxidizing agents, of a kind well known in the art, as shown, for example, in the Thompson Patent No. 2,312,855, are also present in substantial amounts.

Further objects and advantages of the invention will appear more fully from the following description.

It has been found that excellent phosphate coatings can be produced by the addition of small amounts of zirconium compounds to phosphate coating compositions containing substantial amounts of zinc or manganese and the nitric, chloric or other oxidizing radical. The zirconium may be present in various forms, but the preferred addition product is hydrated zirconium oxide having the general formula $ZrO_2 \cdot XH_2O$. This is also sometimes called zirconium hydroxide, with the specific formula $Zr(OH)_4$.

However, other zirconium compounds may also be used, including zirconium ammonium fluoride, $$Zr(NH_4)_3F_6$$

ammonium zirconyl carbonate, $$(NH_4)_3ZrOH(CO_3)_3 \cdot 2H_2O$$

zirconium carbonate, ; zirconium sulfate, 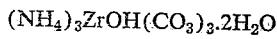 and the like.

In practicing the invention, as is usual in the art, the material for shipment is made up in a concentrated aqueous solution, which may contain from 15% up to about 60% of water. This concentrate is used by adding from 2 to 8 ounces per gallon of water for baths, while as low as 1 ounce per gallon may be used for spray coating.

The active coating ingredients should include from about 10% to about 40% of zinc or manganese, with phosphoric acid at least 15% in excess of the amount required to react with the zinc or manganese, or in other words the ratio of free to total phosphoric acid should be at least about 1 to 7, a ratio of 1 to 4.2 being preferable. The minimum preferred amount of the oxidizing radical is at least 12% in the case of the stronger oxidizing agents such as the chlorates, while for the somewhat weaker nitrates a minimum of 15% is desirable. Proportions of oxidizing radical as high as about 30% may be used. The zirconium should be within the range of 0.15% to 2%.

In the phosphate coating bath, the proportions may range, per gallon, from 0.06 to 2 ounces of zinc or manganese, from 0.07 to 1.4 ounces per gallon of the oxidizing radical, and from 0.009 to 0.10 ounce of zirconium.

Of course, mixtures of zinc and manganese compounds mixtures of different oxidizing agents and mixtures of different zirconium compounds may be used.

The following compositions are examples of those which may be used in accordance with the invention.

Composition A

| Material: | Percent |
|---|---|
| Zinc nitrate | 53 |
| Phosphoric acid 75% | 38 |
| Zinc oxide | 6½ |
| Hydrated zirconium oxide | 2½ |

Composition B

| Material: | Percent |
|---|---|
| Zinc nitrate | 52 |
| Phosphoric acid 75% | 40 |
| Zinc oxide | 7 |
| Ammonium zirconyl carbonate | 1 |

Composition C

| Material: | Percent |
|---|---|
| Zinc oxide | 23 |
| Phosphoric acid 75% | 44 |
| Sodium nitrate | 32 |
| Zirconium oxychloride | 1 |

Composition D

| Material: | Percent |
|---|---|
| Manganic hydroxide | 23 |
| Phosphoric acid 75% | 44 |
| Sodium nitrate | 43 |
| Ammonium zirconyl carbonate | 1 |

Composition E

| Material: | Percent |
|---|---|
| Manganous carbonate | 35 |
| Phosphoric acid 75% | 37 |
| Sodium nitrate | 27 |
| Ammonium zirconyl carbonate | 1 |

Composition F

| Material: | Percent |
|---|---|
| Manganous nitrate | 62 |
| Phosphoric acid 75% | 37 |
| Hydrated zirconium oxide | 1 |

The following are examples of commercially usable concentrates embodying the invention:

Composition G

| Material: | Percent |
|---|---|
| Zinc nitrate | 43.6 |
| Phosphoric acid 75% | 30.9 |
| Zinc oxide | 4.7 |
| Ammonium zirconyl carbonate | 1.3 |
| Water | 19.5 |

Composition H

| Material: | Percent |
|---|---|
| Zinc oxide | 10.0 |
| Phosphoric acid 75% | 39.0 |
| Ammonium zirconyl carbonate | 1.0 |
| Sodium chlorate | 10.0 |
| Water | 40.0 |

Composition I

| Material: | Percent |
|---|---|
| Zinc oxide | 10.0 |
| Phosphoric acid 75% | 42.0 |
| Zinc nitrate | 10.0 |
| Ammonium zirconyl carbonate | 1.0 |
| Sodium chlorate | 10.0 |
| Water | 27.0 |

Composition J

| Material: | Percent |
|---|---|
| Zinc oxide | 10.0 |
| Phosphoric acid 75% | 39.0 |
| Sodium perborate | 3.0 |
| Sodium persulfate | 10.0 |
| Ammonium zirconyl carbonate | 1.0 |
| Water | 37.0 |

Composition K

| Material: | Percent |
|---|---|
| Zinc oxide | 10.0 |
| Phosphoric acid 75% | 39.0 |
| Sodium persulfate | 10.0 |
| Ammonium zirconyl carbonate | 1.0 |
| Water | 40.0 |

It is possible to use other oxidizing agents alone, in combination with chlorates or in combination with each other in the above examples. Examples of other oxidizing agents are: The oxy-acids (nitric, nitrous, chromic, chloric and other halogen oxy-acids) and their salts, peroxides such as hydrogen peroxide, alkali and alkali earth metal peroxides, etc.; the higher valent acid oxides; the perborates; organic nitrates, nitroso compounds; permanganic acid and its salts; persulfates and other "per" compounds.

These compositions are used preferably at temperatures of around 200° F. The time required for coating is from 1 to 5 minutes.

In the use of these materials, if scale is present, pickling may be required before coating. The metal surface should then be cleaned wtih a solvent-emulsion or alkali type cleaner. The composition is then applied for the requisite time, the metal is rinsed wtih water and then with a dilute phosphoric-chromic acid rinse.

The material is of general applicability, producing phosphate coatings on ferrous metals, aluminum, zinc and other metals as well as alloys thereof.

While we have described herein some embodiments of our invention, we wish it to be understood that we do not intend to limit ourselves thereby except within the scope of the claims hereto or hereinafter appended.

We claim:

1. A phosphate coating bath consisting essentially of an aqueous solution containing, per gallon of water, at least about 0.06 ounce of at least one metal selected from the group consisting of zinc and manganese, said metal being present in the form of a compound at least about 0.07 ounce of at least one anion of an oxidizing compound, phosphoric acid in an amount at least 15% in excess of the amount necessary to react wtih such metal, and at least 0.0009 ounce of zirconium in the form of a compound in which the zirconium is present in basic form.

2. A phosphate coating bath consisting essentially of an aqueous solution containing, per gallon of water, about 0.06 to about 2 ounces of at least one metal selected from the group consisting of zinc and manganese, said metal being present in the form of a compound at least about 0.07 ounces to about 1.4 ounces of at least one anion of an oxidizing compound, phosphoric acid in an amount at least 15% in excess of the amount necessary to react with such metal, and between about 0.0009 ounces and 0.10 ounce of zirconium in the form of a compound in which the zirconium is present in basic form.

3. A phosphate coating bath consisting essentially of an aqueous solution containing, per gallon of water, about 0.06 to about 2 ounces of at least one metal selected from the group consisting of zinc and manganese, said metal being present in the form of a compound about 0.09 to about 1.4 ounces of anion of a nitrate, phosphoric acid in an amount at least 15% in excess of the amount necessary to react with such metal, and at least 0.0009 ounce of zirconium in the form of a compound in which the zirconium is present in basic form.

4. A phosphate coating bath consisting essentially of an aqueous solution containing, per gallon of water, about 0.06 to about 2 ounces of at least one metal selected from the group consisting of zinc and manganese, said metal being present in the form of a compound at least about 0.07 to about 1.4 ounces of at least one anion of an oxidizing compound, phosphoric acid in such amount that the ratio of free phosphoric acid to total phosphoric acid is at least 1 to 7, and at least 0.0009 ounce of zirconium in the form of a compound in which the zirconium is present in basic form.

5. A phosphate coating bath consisting essentially of an aqueous solution containing, per gallon of water, about 0.06 to about 2 ounces of at least one metal selected from the group consisting of zinc and manganese, said metal being present in the form of a compound about 0.09 to about 1.4 ounces of anion of a nitrate, phosphoric acid in such amount that the ratio of free phosphoric acid to total phosphoric acid is at least 1 to 7, and at least 0.0009 ounce of zirconium in the form of a compound in which the zirconium is present in basic form.

6. A phosphate coating composition essentially consisting of, as coating ingredients, at least 10% of at least one metal selected from the group consisting of zinc and manganese, said metal being present in the form of a compound at least 12% of an anion of an oxidizing compound, phosphoric acid in such amount that the ratio of free phosphoric acid to total phosphoric acid is at least 1 to 7, and at least 0.15% of zirconium in the form of a compound in which the zirconium is present in basic form.

7. A phosphate coating composition essentially consisting of, as coating ingredients, at least 10% of at least one metal selected from the group consisting of zinc and manganese, said metal being present in the form of a compound at least 15% of anion of a nitrate, phosphoric acid in such amount that the ratio of free phosphoric acid to total phosphoric acid is at least 1 to 7, and at least 0.15% of zirconium in the form of a compound in which the zirconium is present in basic form.

8. A phosphate coating composition essentially consisting of, as coating ingredients, from 10% to 40% of at least one metal selected from the group consisting of zinc and manganese, said metal being present in the form of a compound from 12% to 30% of an anion of an oxidizing compound, phosphoric acid in such amount that the ratio of free phosphoric acid to total phosphoric acid is at least 1 to 7, and 0.15% to 2% of zirconium in the form of a compound in which the zirconium is present in basic form.

9. A phosphate coating composition essentially consisting of, as coating ingredients, from 10% to 40% of at least one metal selected from the group consisting of zinc and manganese, said metal being present in the form of a compound from 15% to 30% of anion of a nitrate, phosphoric acid in such amount that the ratio of free phosphoric acid to total phosphoric acid is at least 1 to 7, and 0.15% to 2% of zirconium in the form of a compound in which the zirconium is present in basic form.

10. A method of coating metal which comprises bringing into contact with the metal a material as claimed in claim 1 for a sufficient length of time to form a coating on the metal.

References Cited in the file of this patent
UNITED STATES PATENTS

| | | |
|---|---|---|
| 2,312,855 | Thompson | Mar. 2, 1943 |
| 2,456,947 | Jernstedt | Dec. 21, 1948 |
| 2,462,196 | Jernstedt | Feb. 22, 1949 |